United States Patent

Aymerich et al.

Patent Number: 5,366,265
Date of Patent: Nov. 22, 1994

[54] SPRING HINGE FOR AUTOMOBILE SUNVISORS

[75] Inventors: José Aymerich; Jesûs Prat, both of Rubi, Spain

[73] Assignee: FICO I.I.M.,S.A., Barcelona, Spain

[21] Appl. No.: 94,127

[22] PCT Filed: Jan. 11, 1993

[86] PCT No.: PCT/ES93/00001
§ 371 Date: Jul. 23, 1993
§ 102(e) Date: Jul. 23, 1993

[87] PCT Pub. No.: WO93/13957
PCT Pub. Date: Jul. 22, 1993

[30] Foreign Application Priority Data

Jan. 15, 1992 [ES] Spain ............ 9200077

[51] Int. Cl.$^5$ ............... B60J 3/02
[52] U.S. Cl. ............... 296/97.12; 296/97.9
[58] Field of Search ............... 296/97.9, 97.12, 97.13

[56] References Cited

U.S. PATENT DOCUMENTS

| | | | |
|---|---|---|---|
| 4,428,612 | 1/1984 | Viertel et al. | 296/97.12 |
| 4,785,500 | 11/1988 | Langridge | 296/97.12 X |
| 5,280,988 | 1/1994 | Gute | 296/97.12 X |

FOREIGN PATENT DOCUMENTS

| | | |
|---|---|---|
| 0057811 | 8/1982 | European Pat. Off. . |
| 2551633 | 5/1977 | Germany . |
| 9100391 | 2/1991 | Spain . |
| 2061210 | 5/1981 | United Kingdom . |
| 2014624 | 9/1992 | WIPO ............ 296/97.12 |

Primary Examiner—Joseph Pape
Attorney, Agent, or Firm—Michael J. Striker

[57] ABSTRACT

A spring hinge for automobile sunvisors has a one-piece member composed of a resilient material and having an upper region formed as a longitudinal housing for grippingly receiving a pivot pin of a bracket member of a sunvisor, an intermediate region formed as a longitudinal narrowing, and a lower region formed as a substantially rectangular longitudinal portion with two side walls, the longitudinal portion having two extensions extending inwardly from lower end of the side walls and two terminal flanges extending from free ends of the extensions toward the housing, each of the side walls and the extensions being provided with two transverse slits starting from the narrowing and arranged at opposite sides from a transverse center line of each side wall and the bent extension so as to form a central flexing grip tab and two lateral attachment tabs in each the side wall and the extension so that when the spring hinge is fully housed in a hollow body member of the sunvisor the attachment tabs are located permanently at a relatively short distance from inner walls of the hollow body member.

6 Claims, 2 Drawing Sheets

SPRING HINGE FOR AUTOMOBILE SUNVISORS

BACKGROUND OF THE INVENTION

The present invention relates to a spring hinge for automobile sunvisors.

More particularly, it relates to a spring hinge for an automobile sunvisor having a hollow body member produced by blow molding of a plastic material.

It is well known that the sunvisors normally fitted as original equipment in automobiles have a hinge formed, basically, by a pivot pin forming part of a bracket member attached to the vehicle structure and normally attached to the vehicle roof and by a spring which is fixedly attached to the sunvisor. The spring receives and retains the pivot pin so that the sunvisor may be rotated around the pivot pin and firmly hold any position, as selected by the user, in which it is placed among the normal positions of use. Furthermore, the pivot pin and retaining spring are provided with means, generally formed by respective positioning flats, which more firmly set the rest position or positions of the sunvisor.

In sunvisors including a hollow body member of essentially prismatic shape produced by blow molding of a plastics material and a retaining spring formed as a spring hinge for performing spring and hinge functions, the spring is housed completely within the hollow body member. It is accessible from the outside by means of a through hole provided in the hollow body member and receiving the corresponding portion of the pivot pin of the bracket member.

As an example of known embodiments of sunvisors such as those described above, in which the retaining spring formed as a spring hinge is completely housed within the hollow body member, there may be cited Spanish patent P 9100391. The patent P 9100391 discloses a retaining spring of essentially rectangular form, which is symmetrical about its longitudinal plane, defining two superimposed respectively semicylindrical and prismatic portions, in which the semicylindrical, or upper, portion receives the pivot pin of the bracket member.

The retaining spring disclosed in Spanish patent P 9100391 is positionally fixed inside the hollow body member by way of a plurality of recesses formed in the walls of said body member and flanking it and by the resilience of the spring itself, the side walls of which press directly against the corresponding inner surfaces of the side walls of the hollow body member. The fact that the retaining spring bears directly on the inner surfaces of the hollow body member means that when the user moves the sunvisor from the rest position(s) to any other position of use, or when the sunvisor is moved precisely to the rest position(s), the action of the pivot pin on the retaining spring, by deforming it, causes in turn deformation of the hollow body member after an extended period of use, precisely in the immediate surroundings of the position occupied by the retaining spring. Such deformation of the sunvisor hollow body member may be sufficiently serious to be felt by the touch, which is a drawback and, at times, even gives an irregular finish to the sunvisor.

SUMMARY OF THE INVENTION

Accordingly, it is an object of the present invention to provide a spring hinge for automobile sunvisors, which avoids the disadvantages of the prior art.

More particularly, it is an object of the present invention to provide a spring hinge for automobile sunvisors which does not cause any deformation of a hollow body member and consequently of the sunvisor during changes from or to rest positions of the sunvisor.

In keeping with these objects and with others which will become apparent hereinafter, one feature of the present invention resides, briefly stated, in a spring hinge for automobile sunvisors in which in accordance with the present invention a wall of a rectangular portion of the spring hinge facing a housing of an upper region is formed by bent extensions of side walls with which it forms a right angle and the extension are provided longitudinally at their free end with bent terminal flanges directed toward the housing, and each of the two side walls of the rectangular portion and their bent extension have two transverse slits starting from a center region or narrowing and arranged preferably at the same distance from a transverse center line defining in each of the side walls and in their bent extensions respective lateral or attachment tabs and a center flexing grip top, so that the attachment tabs when the spring hinge is fully housed in the hollow member are permanently at a relatively short distance from the corresponding inner walls of the hollow body member.

In accordance with a further characteristic embodiment of the spring hinge for automobile sunvisors of the invention, the sunvisor is characterized in that at least on one of the side walls of the rectangular portion and on the centre flexing grip tab there is a tongue having the free end bearing against the inner surface of said centre flexing grip tab facing it, with the lesser or greater length of the tongue determining a greater or lesser gripping pressure, respectively, of the spring hinge on the pivot pin of the bracket member.

The features of the spring hinges of the invention described above provide a solution to the problems caused by the resilient deformation of the known embodiments of retaining springs wholly housed in the sunvisor hollow body member. With the retaining spring pressing permanently against the corresponding inner walls of the hollow body member, this deformation, as said before, causes deformation of the body member and, consequently, of the sunvisor. In fact, when the spring hinge of the invention is wholly housed in the hollow body member such that its attachment tabs are permanently at a relatively short distance from the corresponding inner side walls of the hollow body member, preferably by means of retaining projections provided to such end in the hollow body member itself, the passage of the sunvisor from or to the rest position(s) causes in the spring hinge, by the action of the pivot pin of the bracket member, resilient deformation of the centre flexing grip tabs thereof, without this resilient deformation being transmitted in any way to the hollow body member. In fact, the distance between the attachment tabs of the spring hinge and the corresponding walls of the hollow body member, which distance is determined by the said retaining projections provided for the purpose, prevents the centre flexing grip tabs from contacting the said walls of the hollow body member during their resilient deformation under normal conditions of use.

The novel features which are considered as characteristic for the invention are set forth in particular in the appended claims. The invention itself, however, both as to its construction and its method of operation, together with additional objects and advantages thereof, will be

DESCRIPTION OF PREFERRED EMBODIMENTS

Figure 1:
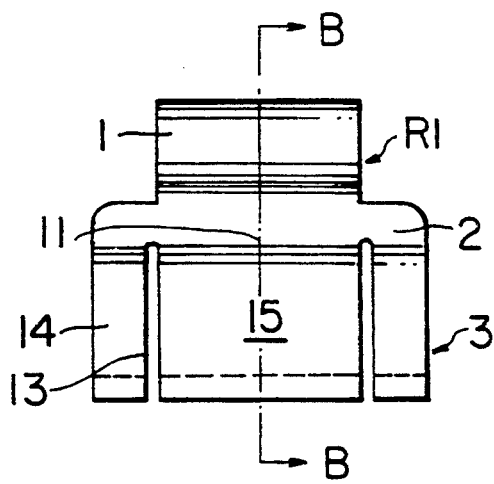
FIG. 1 is a side view of showing an embodiment R1 of the spring hinge of the invention.

The spring hinges R1 and R2 for automobile sunvisor hinges of the invention described as an embodiment are essentially parallelepipedic in shape with rounded edges and are symmetrical about the longitudinal centre line A—A, as shown in FIGS. 1, 2, 6 and 7. The spring hinges R1 and R2 of the invention are preferably formed from a highly resilient steel sheet, having a quadrangular profile.

Both spring hinges R1 and R2 have like members which, for greater clarity of description, are designated, in this description and in the drawing figures, with the same reference numerals. In this way, hereinafter, the embodiment of the spring hinge R1 of the invention and shown in FIGS. 1 to 5 is given and this description is equally applicable, by extension, to the spring hinge embodiment R2 of the invention shown in FIGS. 6 to 8.

Figure 2:
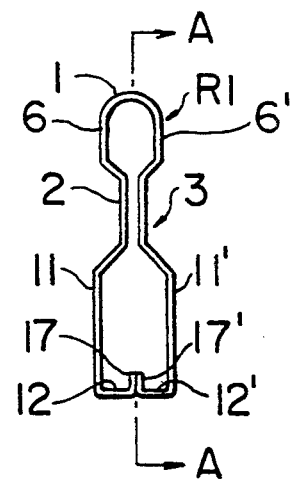
FIG. 2 is a front view of the spring hinge of the invention shown in FIG. 1.

FIGS. 1 and 2 show how the spring hinge R1 is formed longitudinally by the housing 1, at the upper regions, the narrowing 2 at the intermediate region, and the rectangular portion 3 at the lower region.

In this embodiment of the spring hinge R1, the housing 1 is shorter than the narrowing 2 and the rectangular portion 3. The housing 1 is centered relative to the transverse centre line of the spring hinge R1. Obviously, the length of the housing 1 is given in dependence of the needs of each particular application, without this affecting the correct operation of the spring hinge R1 of the invention. The same is equally applicable to the narrowing 2 and to the rectangular portion 3.

Figure 3:
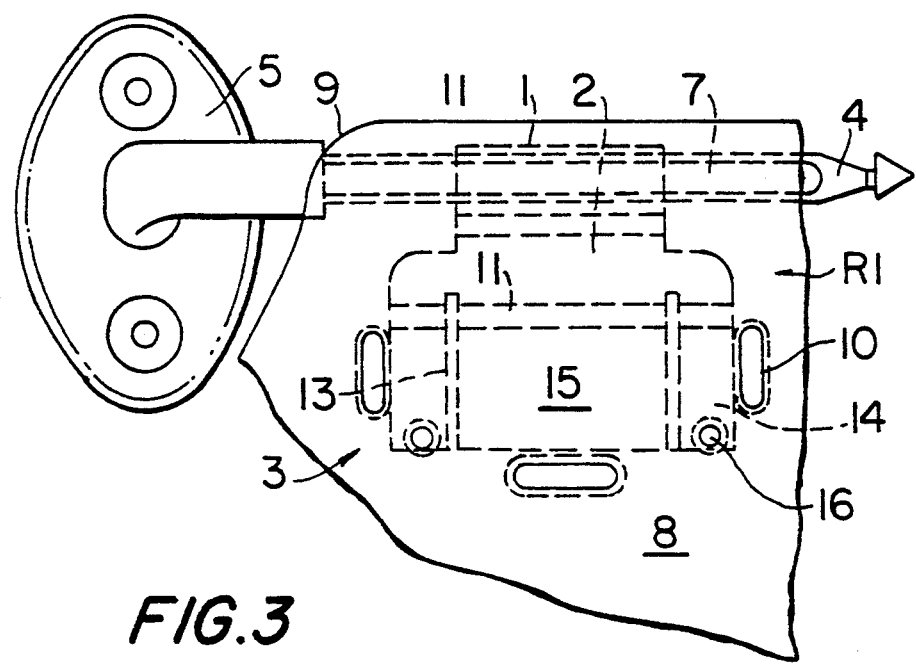
FIG. 3 is a side view of the embodiment R1 of the spring hinge of the invention housed in the hollow body member of a sunvisor.
Figure 4:
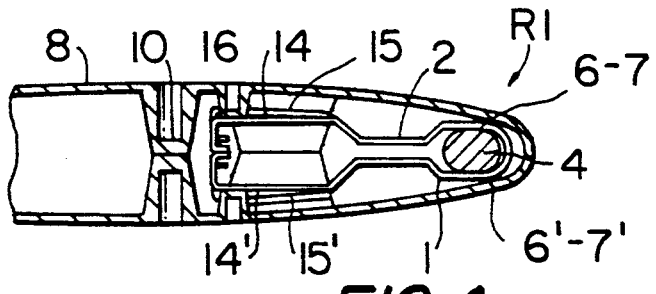
FIG. 4 is a cross-section view of the embodiment R1 of the spring hinge of the invention mounted on the pivot pin of a bracket member in the rest position.
Figure 5:
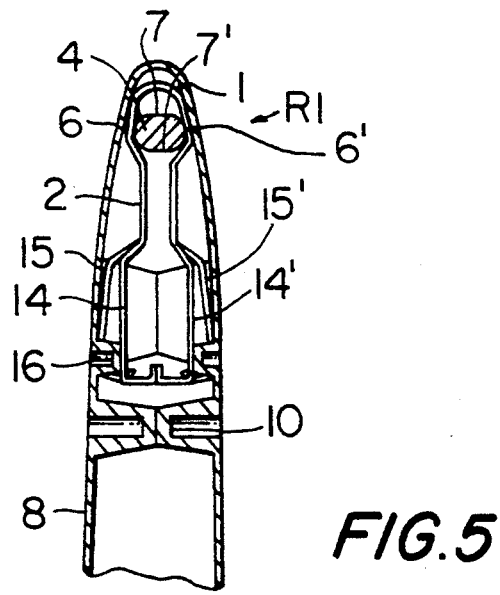
FIG. 5 is a cross-section view of the embodiment R1 of the spring hinge of the invention mounted on the pivot pin of a bracket member in a position other than the rest position.

FIGS. 2, 4 and 5 show how the housing 1 is, in this embodiment, essentially semicylindrical and is dimensioned in such a way that, as shown in FIGS. 3, 4 and 5, it may grippingly receive the pivot pin 4 of the bracket member 5 attached to the automobile structure.

FIGS. 2, 4 and 5 show how the housing 1 of the spring hinge R1 is formed with the two positioning flats 6 and 6′ which are dimensioned in functional correspondence with the positioning flats 7 and 7′ formed longitudinally on the pivot pin 4 of the bracket member 5, as shown in FIGS. 3, 4 and 5.

FIGS. 3, 4, and 5 show how the spring hinge R1 is housed in the interior of the hollow body member 8 of the sun visor. The hollow member 8 is produced by blow molding of a plastic material. For greater clarify of the disclosure it has sunvisor and which, for greater clarity of disclosure, has been shown only in part. In FIGS. 3, 4 and 5, the spring hinge R1 is housed in the end of the hollow body member 8 corresponding to the position occupied by the bracket member 5 and is accessible from the outside only through the through hole 9 formed for such purpose in the hollow body member 8.

The spring hinge R1 is fixed in position by way of three recesses 10. They are formed on each of the corresponding side walls of the hollow body member 8 and flank the spring hinge R1, as shown in FIG. 3. It is understood that the number and arrangement of the recesses 10 may vary depending on the needs of each particular application and/or the shape given to the spring hinge R1.

FIGS. 1 to 5 show how the narrowing 2 forms longitudinally the intermediate region of the spring hinge R1 defining respective essentially rectangular portions which merge into the housing 1 and in to the rectangular portion 3 at an angle therewith.

FIGS. 2, 4 and 5 show how the two side walls 11, 11′ of the rectangular portion 3 are extended, along the whole of the length thereof, in respective bent extensions 12, 12′. Their free ends along the whole length define respective bent terminal flanges 17, 17′ which are directed towards the housing 1 of the spring hinge R1.

Each of the two side walls 11 and 11′, as well as the respective bent extensions 12 and 12′ of the rectangular portion 3 have, respectively, the two slits 13. The slits are transverse to the spring hinge R1 and extend from the narrowing 2, as shown in FIGS. 1 and 3.

The two slits 13 of each of the two side walls 11, 11′ and of the respective bent extensions 12, 12′, are arranged symmetrically on both sides of the transverse centre line, as shown in FIGS. 1 and 3. They define, at the ends of the side walls 11 and 11′, and at the respective bent extensions 12 and 12′, the side or attachment tabs 14 and 14′ respectively and, in the centre portion thereof, the centre flexing grip tabs 15 and 15′, respectively.

FIGS. 3, 4 and 5 show how the hollow body member 8 of the sunvisor is formed internally on both side walls, between the positioning recesses 10, with essentially cylindrical attachment projections 16. The projections may be of any other shape, such as prismatic, which is appropriate for each particular application.

When the spring hinge R1 is housed in the hollow body member 8 of the sunvisor, as shown in FIGS. 3, 4 and 5, the attachment projections 16 are arranged in such a way as to be superimposed on the attachment tabs 14 and 14′. The attachment projections 16 being dimensioned in such a way as to maintain the attachment tabs 14 and 14′ at a relatively short distance from the inner surface of the corresponding side walls of the hollow body member 8.

FIG. 4 shows how the spring hinge R1 is disposed inside the hollow body member 8 once the pivot pin 4 of the bracket member 5 has been fitted into the housing 1 of the spring hinge R1, through the through hole 9 formed in the hollow body member 8. In FIG. 4, the hollow body member 8 of the sunvisor occupies the rest position. Under these conditions, the positioning flats 6, 6′ of the housing 1 of the spring hinge R1 bear, under the action of the spring hinge R1, on the positioning flats 7 and 7' respectively of the pivot pin 4 of the bracket member 5. This pressure, under normal conditions of use, prevents the vibrations caused when the vehicle is running from causing untimely release of the sunvisor.

FIG. 4 shows how in the rest position, urged by the pivot pin 4 of the bracket member 5, the centre flexing grip tabs 15 and 15' of the spring hinge R1 project a relatively short distance beyond the attachment tabs 14 and 14' respectively, without touching the inner surface of the corresponding side walls of the hollow body member 8 in any case.

FIG. 5 shows a position other than the rest position occupied by the hollow body member 8 of the sunvisor. In this position, the gripping action of the positioning flats 6 and 6' of the spring hinge R1 on the pivot pin 4 of the bracket member 5 prevents untimely release of the sunvisor, as described above. In this position of the hollow body member, the pivot pin causes resilient deformation of the centre flexing grip tabs 15 and 15' of the spring hinge R1 in such a way that they project out beyond the attachment tabs 14 and 14' respectively further than in the rest position shown in FIG. 4, without the centre flexing grip tabs 15, 15' touching the inner surface of the corresponding side walls of the hollow body member 8 in any case, as mentioned above for the rest position.

In this way, the features of the spring hinge R1 of the invention prevent the resilient deformation of the spring hinge from being transmitted to the hollow body member 8 of the sunvisor, while moving the sunvisor from the rest position shown in FIG. 4 to any other position, as might be the one shown in FIG. 5, and vice versa. In this way, the hollow body member 8 and, consequently, the sunvisor do not suffer any deformation, as happens with the known embodiments of retaining springs fully housed in the hollow body member of sunvisors.

Figure 6:
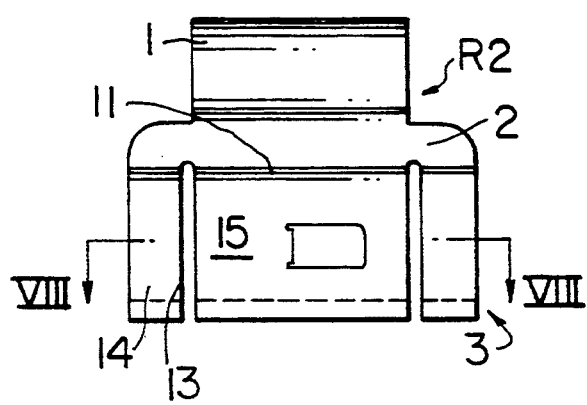
FIG. 6 is a side view showing an embodiment R2 of the spring hinge of the invention.
Figure 7:
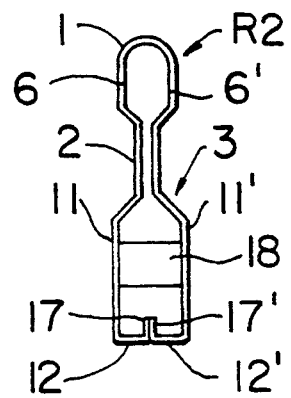
FIG. 7 is a front view of the spring hinge of the invention shown in FIG. 6.
Figure 8:
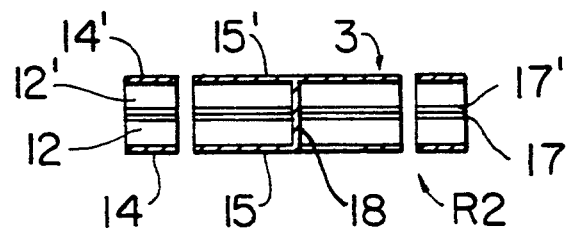
FIG. 8 is a cross section view on the line VIII—VIII of FIG. 6.

FIGS. 6 to 8 show an embodiment of the spring hinge R2 of the invention which, as said before, comprises all the elements described for the embodiment of the spring hinge R1 of the invention.

FIGS. 6 to 8 show how the centre flexing grip tab 15 of the side wall 11 of the rectangular portion 3 of the spring hinge R2 is provided with the tongue 18, the free end of which bears perpendicularly against the inner side wall of the centre flexing grip tab 15' facing it. In this embodiment of the spring hinge R2, the tongue 18 is on the centre flexing grip tab 15 although it could obviously be on the centre flexing grip tab 15' facing it and bear against the other centre flexing grip tab 15, without this affecting the operation of the spring hinge R2.

FIGS. 7 and 8 show how, in this embodiment, the tongue 18 of the spring hinge R2 is coextensive with the wall of the rectangular portion 3 formed by the bent extensions 12 and 12', respectively. It will be understood that, precisely the shorter or greater length of the tongue 18 will determine the greater or lesser gripping pressure, respectively, of the positioning flats 6 and 6' of the spring hinge R2 on the pivot pin of the bracket member 5, without this affecting the operation of the spring hinge R2 which is no different from that as described for the spring hinge R1.

It will be understood that each of the elements described above, or two or more together, may also find a useful application in other types of constructions differing from the types described above.

While the invention has been illustrated and described as embodied in a spring hinge for automobile sunvisor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A spring hinge for automobile sunvisors, comprising a one-piece member composed of a resilient material and having a longitudinal center line and a transverse center line, an upper region formed as a longitudinal housing for grippingly receiving a pivot pin of a bracket member of a sunvisor, an intermediate region formed as a longitudinal narrowing, and a lower region formed as a substantially rectangular longitudinal portion with two side walls, said longitudinal portion having two bent extensions extending inwardly from lower ends of said side walls and two terminal flanges extending from free ends of said extensions toward said housing, each of said side walls and said bent extensions being provided with two transverse slits starting from said narrowing and arranged at opposite sides from said transverse center line so as to form a central flexing grip tab and two lateral attachment tabs in each said side wall and said bent extension so that when the spring hinge is fully housed in a hollow body member of the sunvisor said attachment tabs are located permanently at a relatively short distance from inner walls of the hollow body member.

2. A spring hinge as defined in claim 1, wherein said housing has housing side walls provided with positioning flats which are dimensioned in correspondence with positioning flats of the pivot pin of the bracket member.

3. A spring hinge as defined in claim 1, wherein side walls of said rectangular longitudinal portion are located somewhat farther from said longitudinal center line than side walls of said housing.

4. A spring hinge as defined in claim 1, wherein said hinge member is substantially parallellepipedic with rounded edges and is open at two opposite sides and also symmetrical relative to said longitudinal central line.

5. A spring hinge as defined in claim 1, wherein said rectangular longitudinal portion has a tongue extending from one of said flexing grip tabs and abutting against an inner surface of the other of said flexing grip tabs and determining a gripping pressure of the spring hinge on the pivot pin of the bracket member.

6. An automobile sun visor, comprising a hollow body member; a bracket member provided with a pivot pin; and a spring hinge having a one-piece member composed of a resilient material and having a longitudinal center line and a transverse center line, an upper region formed as a longitudinal housing for grippingly receiving said pivot pin of said bracket member of a sunvisor, an intermediate region formed as a longitudinal narrowing, and a lower region formed as a substantially rectangular longitudinal portion with two side walls, said longitudinal portion having two bent extensions extending inwardly from lower end of said side walls and two terminal flanges extending from free ends of said bent extensions toward said housing, each of said side walls and said extensions being provided with two transverse slits starting from said narrowing and arranged at opposite sides from said transverse center line of each side wall and said bent extension so as to form a central flexing grip tab and two lateral attachment tabs in each said side wall and said bent extension so that when the spring hinge is fully housed in said hollow body member of the sunvisor said attachment tabs are located permanently at a relatively short distance from inner walls of said hollow body member.

* * * * *